United States Patent
Clausen et al.

(10) Patent No.: US 7,147,110 B2
(45) Date of Patent: Dec. 12, 2006

(54) FILTER ASSEMBLY WITH VENTED FILTER ELEMENT

(75) Inventors: Michael D. Clausen, Turlock, CA (US); Russell D. Jensen, Modesto, CA (US)

(73) Assignee: Parker-Hannifin Corporation, Cleveland, OH (US)

(*) Notice: Subject to any disclaimer, the term of this patent is extended or adjusted under 35 U.S.C. 154(b) by 335 days.

(21) Appl. No.: 10/902,620

(22) Filed: Jul. 29, 2004

(65) Prior Publication Data

US 2005/0023209 A1   Feb. 3, 2005

Related U.S. Application Data

(60) Provisional application No. 60/492,196, filed on Aug. 1, 2003.

(51) Int. Cl.
 *B01D 35/28* (2006.01)
(52) U.S. Cl. ................. 210/436; 210/472; 210/450
(58) Field of Classification Search ........... 210/436, 210/450, 472
See application file for complete search history.

(56) References Cited

U.S. PATENT DOCUMENTS

| | | | |
|---|---|---|---|
| 4,283,289 A | 8/1981 | Meyst et al. | |
| 4,721,563 A | 1/1988 | Rosaen | |
| 5,382,361 A | 1/1995 | Brun | |
| 5,413,711 A | 5/1995 | Janik | |
| 5,449,454 A | 9/1995 | Hickok | |
| 5,453,184 A | 9/1995 | Handtmann | |
| 5,489,384 A | 2/1996 | Janik et al. | |
| 5,525,225 A | 6/1996 | Janik et al. | |
| 5,951,862 A | 9/1999 | Bradford | |

FOREIGN PATENT DOCUMENTS

| | | |
|---|---|---|
| DE | 4330840 | 2/1995 |
| DE | 4330840 C1 * | 2/1995 |
| DE | 19519352 | 11/1996 |
| DE | 19519352 A1 * | 11/1996 |
| DE | 19538883 | 4/1997 |
| DE | 19716085 | 10/1998 |
| FR | 2822395 | 9/2002 |
| WO | 0185304 | 11/2001 |
| WO | WO 02/076568 | 10/2002 |

OTHER PUBLICATIONS

Copy of Notfication of Transmittal of The International Search Report and the Written Opinion of the International Searching Authority, or the Declaration in corresponding International Application No. PCT/US2004/023646.

* cited by examiner

*Primary Examiner*—W. L. Walker
*Assistant Examiner*—Benjamin Kurtz
(74) *Attorney, Agent, or Firm*—Christopher H. Hunter

(57) ABSTRACT

A filter assembly includes a housing with a central standpipe, and cover for enclosing a filter element. The filter element includes a ring of filtration media and first and second end caps. A vent orifice is formed in the first end cap into the central cavity of the media ring. A support core is disposed centrally in the media ring and extends between the first and second end caps. The core includes a separate and independent fluid channel extending from the first end cap that is fluidly connected with the vent orifice, to the second end cap. The second end cap has a central opening, and an annular sealing device bounding the opening which receives and seals to the standpipe and includes through-passages fluidly interconnecting the fluid channel in the core with flow opening(s) along the standpipe or in the lower end of the housing to a drain port.

24 Claims, 5 Drawing Sheets

FILTER ASSEMBLY WITH VENTED FILTER ELEMENT

CROSS-REFERENCE TO RELATED CASES

The present application claims the benefit of the filing date of U.S. Provisional Application Ser. No. 60/492,196; filed Aug. 1, 2003, the disclosure of which is expressly incorporated herein by reference.

FIELD OF THE INVENTION

The present invention relates generally to fluid filters and assemblies, and more particularly to a fuel filter and assembly for a vehicle fuel system.

BACKGROUND OF THE INVENTION

In certain fuel systems, such as for vehicles, a pump is provided to move fuel through the system such as from the tank to the engine. A filter element is sometimes provided downstream (on the pressure side) of the pump to protect downstream components. At start-up and during operation of the system, air can be pushed into the filter housing. It is desirable to vent the accumulated air in the housing to avoid the air being pushed through the element. The air can create erratic fuel delivery, and effect performance of the downstream components.

One solution is to provide a vent orifice in the upper part of the housing. Such a orifice allows the air to bleed slowly out of the housing as the housing is filled with fuel. By sizing the orifice appropriately, and locating the orifice in the upper part of the housing, the orifice will essentially only allow air to vent out. Any loss of fuel is fairly insignificant and can be collected and directed with the air back to tank.

It is also known to locate the vent orifice in the top of a centrally located standpipe, and drain the air/fuel through the standpipe. This requires a seal between the upper end cap and standpipe to separate the incoming, dirt fuel from the outgoing, clean and filtered fuel.

While the above solutions have received some acceptance in the market, they generally require additional valves, seals, plumbing and/or relatively complex components in order to function properly. This can increase the cost of the assembly, and can also add size and weight. And since the vent orifice is part of the housing structure, the orifice must be periodically inspected and cleaned in order to ensure it is not clogged by particulate matter.

Thus, it is believed there is a demand for a filter assembly and element for fluid applications which require a purging of air, where the filter assembly has a simple, low cost design, and where the vent orifice is replaced at regular intervals to minimize the chance of clogging.

SUMMARY OF THE INVENTION

The present invention provides a novel and unique filter assembly and element for fluid applications which require a purging of air, and has a simple, low cost design. The drain path for the vented air is provided centrally through the element, and more particularly, through a separate and independent fluid channel preferably formed integral with a central support core for the element. The fluid channel directs air from a vent orifice in an upper end cap of the filter element—to a drain path through a central standpipe or otherwise through the lower end of the housing to a drain port. The vent orifice is integral with the element, and is thereby replaced when the element is replaced to reduce the risk of clogging.

According to the present invention, the filter assembly includes a housing canister with a lower, closed end and an upper, open end; a removable cover for the open end of the canister; and an inlet port to direct fluid to be filtered into the housing. The cover can be screwed onto or off of the canister to allow easy access to a filter element. The housing further includes a central standpipe projecting upwardly from the closed end of the canister toward the open end. A pair of fluidly-separate flow channels are defined through the standpipe and lower housing end. A first of the flow channels opens to the distal upper end of the standpipe and extends through the standpipe to an outlet port in the lower end of the housing for directing filtered fluid out of the housing. A second of the flow channels extends from one or more openings along the length of the standpipe through a separate flow path in the standpipe to a drain opening in the lower end of the housing for directing air (and any associated fluid leakage) out of the housing to tank. The second flow channel could alternatively be formed separate from the standpipe, such as in the lower end of the housing.

The filter element includes a ring of filtration media having a first, upper end and a second, lower end and circumscribing a central cavity. A first imperforate end cap is sealingly bonded to the first end of the media ring and includes a centrally-located vent orifice. A second imperforate end cap is sealingly bonded to the second end of the media ring and has an annular body portion defining a central opening.

A central support core is disposed in the central cavity of the media ring and supports an inner dimension of the media. The core includes radial flow passages to allow flow passing radially inward through the media to pass internally of the core. The core extends between the first and second end caps, and includes a separate and independent axial fluid passage extending from the first end cap in fluid communication with the vent orifice, to the second end cap. A resilient annular seal is carried by the second end cap and bounds the central opening therein. The annular seal receives and fluidly-seals to the standpipe and/or the lower end of the housing, when the element is located in the housing. The seal includes at least one, and preferably a plurality of through-passages fluidly interconnecting the axial fluid passage in the core with the second opening(s) to the second flow channel in the standpipe. A middle portion of the seal is offset slightly from the standpipe and/or housing to provide a circumferential flow gap such that the flow will pass to the second opening(s) regardless of the circumferential alignment of the through-passages in the seal with the second openings in the standpipe.

The sealing device described above fluidly separates i) the dirty, inlet flow to the media from the clean outlet flow from the media; and ii) the fluid passage in the support core from the flow through the media. The configuration of the sealing device and standpipe also properly axially locates the filter element in the housing.

As such, the filter assembly and element described above provide a novel and unique filter assembly and element for fluid applications which require a purging of air, which has a simple, low cost design. The element has an integral vent orifice which is replaced when the element is replaced to reduce the risk of clogging.

DETAILED DESCRIPTION OF THE PREFERRED EMBODIMENT

Figure 1:
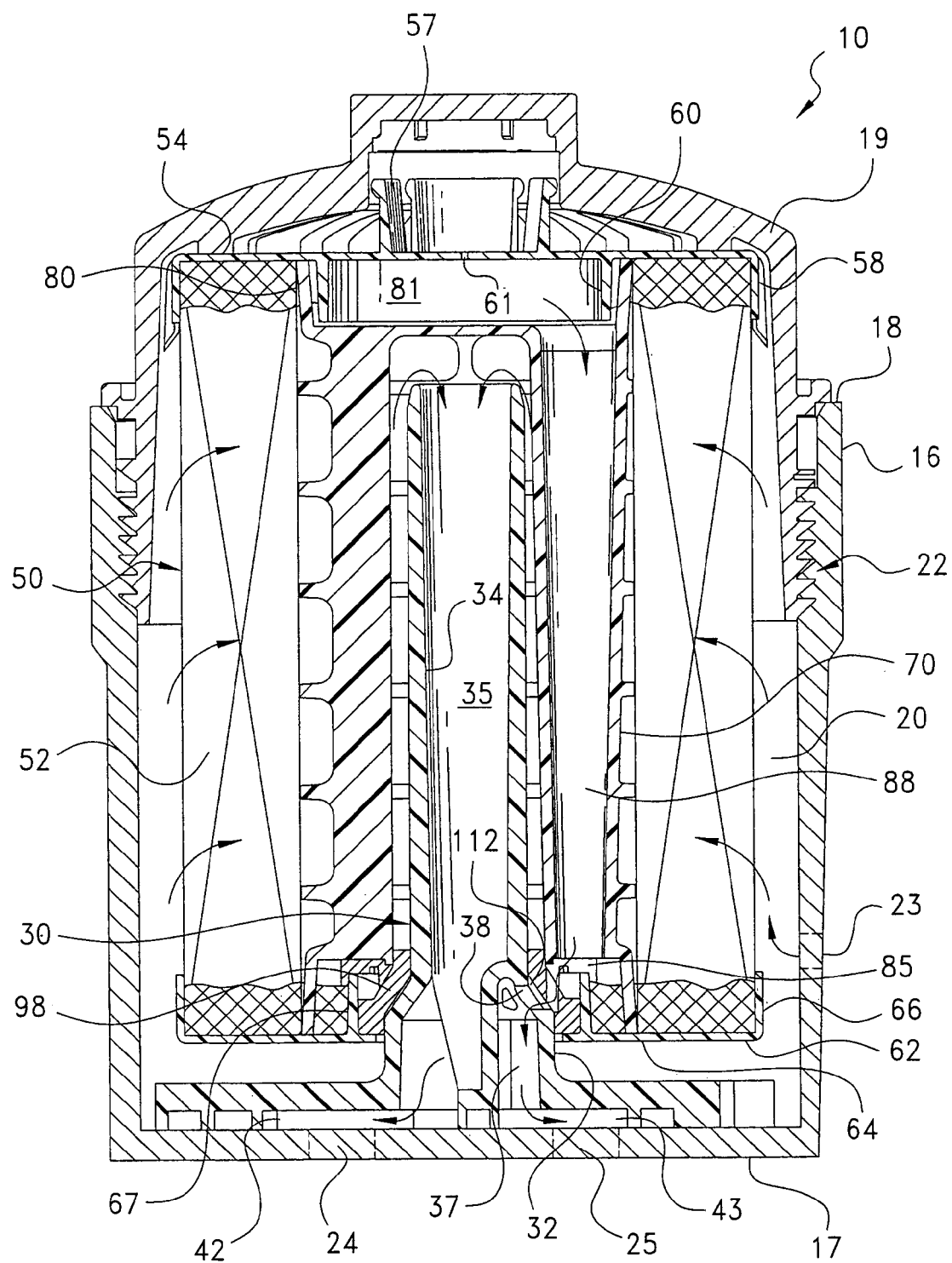
FIG. 1 is a cross-sectional side view of a filter assembly constructed according to the principles of the present invention.

Referring to the drawings, and initially to FIG. 1, a filter assembly constructed according to the principles of the present invention is indicated generally at 10. The filter assembly 10 can be useful for removing particulate and other contaminants from a fluid system, and in one application, is particularly useful as a filter assembly for removing particulate and other contaminant from a fuel stream in a fuel system for a vehicle. In such an application, the filter assembly can be located downstream, on the pressure side of a pump for moving fuel through the system, e.g., from the tank to the engine. Although it should be note that this is only one appropriate location for the filter assembly, and that other locations and applications are possible.

The filter assembly 10 includes a housing comprising a cylindrical canister 16 having a lower, closed end 17 and an upper, open end 18. A cup-shaped cover 19 is attached to the open end of the canister, and defines an internal chamber 20 therewith. Appropriate threads as at 22, are provided between the cover and canister, to allow the cover to be easily screwed onto and off of the canister. A first port (fuel inlet) 23 is provided along the side of the canister (or in the end wall 17) to direct fuel to be filtered (e.g., from the pump or tank) into the housing; while a second port (fluid outlet) 24 is provided in the end wall 17 to direct filtered fuel from the housing to a downstream component, e.g., the engine. A third port (drain) 25 is also provided in the end wall 17 to direct air and any associated leaking fuel back to the tank or reservoir. The canister is preferably formed from metal or other appropriate material using conventional processes (e.g., die-casting, machining, etc.).

Figure 2:
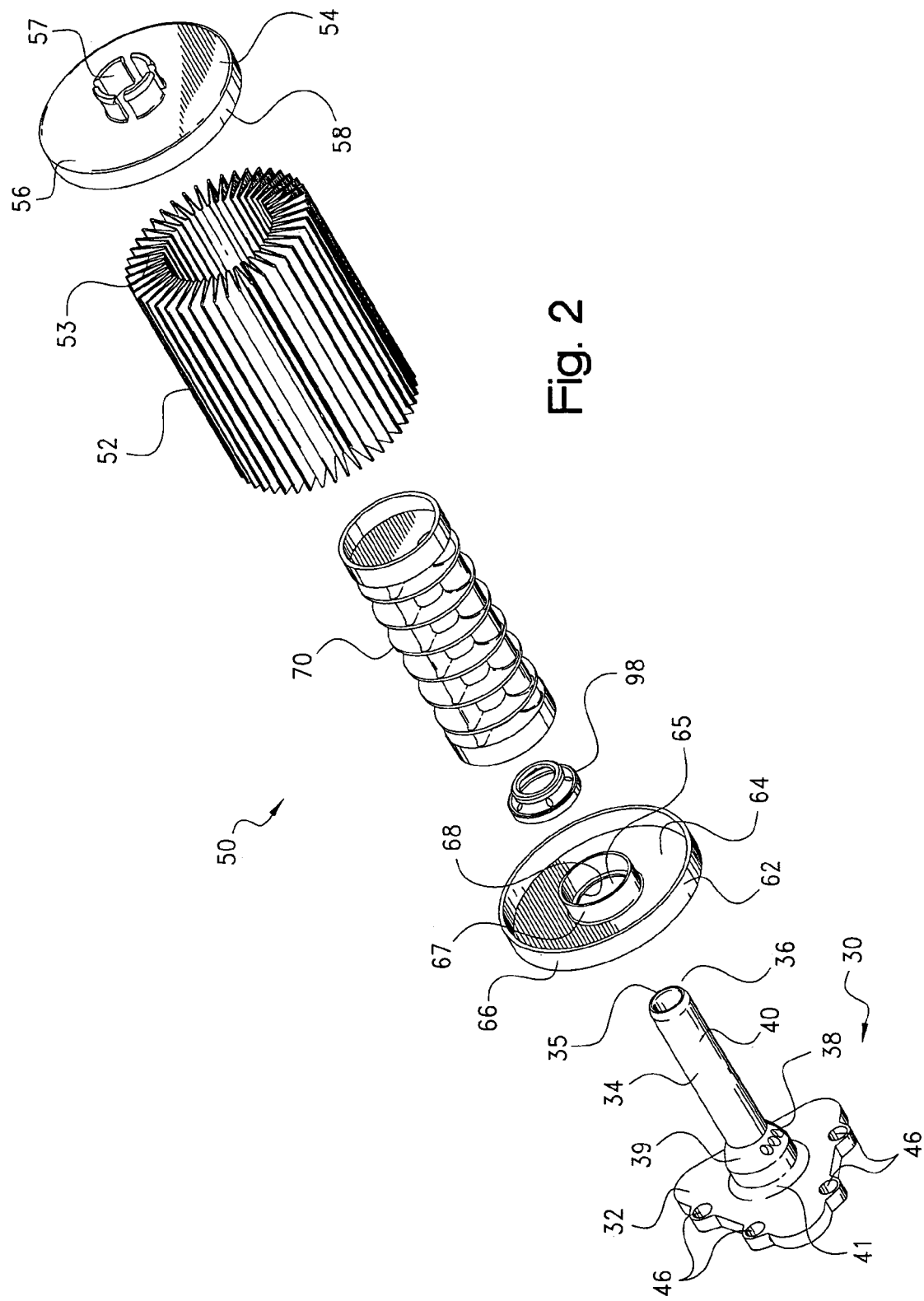
FIG. 2 is an exploded view of the filter assembly.

Referring now also to FIG. 2, a standpipe assembly, indicated generally at 30, is provided internal to the housing, and includes a base 32 and an elongated standpipe member 34, centrally located and extending axially upward, away from the closed end 17 of the housing towards the open end 18. The standpipe 34 is internally divided into a first flow channel 35 extending from the upper distal end 36 of the standpipe to the base 32; and a second flow channel 37, fluidly separate from the first flow channel 35, and extending from at least one, and preferably a plurality of second openings 38 along the length of the standpipe, to base 32. Second openings 38 are preferably formed in a frusto-conical tapered portion 39, which interconnects an upper, radially narrower portion 40 of the standpipe with a lower, radially enlarged portion 41. Base 32 includes appropriate channels 42, 43 in its bottom surface which fluidly and separately interconnect the flow channels 35, 37 in the standpipe 34, with the outlet port 24 and drain port 25, respectively, in the end wall 17. Base 32 includes apertures as at 46 which receive bolts (not shown) to enable the base to be fixedly attached to the end wall 17.

The base 32 and standpipe member 34 are preferably formed from a convention material, such as metal or plastic, in one piece (unitary), with channels 35 and 37 being easily created during the forming process. It is also possible that the standpipe assembly could be formed from multiple pieces fixed together. For example, the standpipe member 34 could be formed in one piece and attached (such as with adhesive or press-fit) to the base 32. It is further possible that all or a portion of the standpipe assembly 30 could be formed in one piece (unitary) with end wall 17, as will be described below with respect to FIG. 6.

Figure 3:
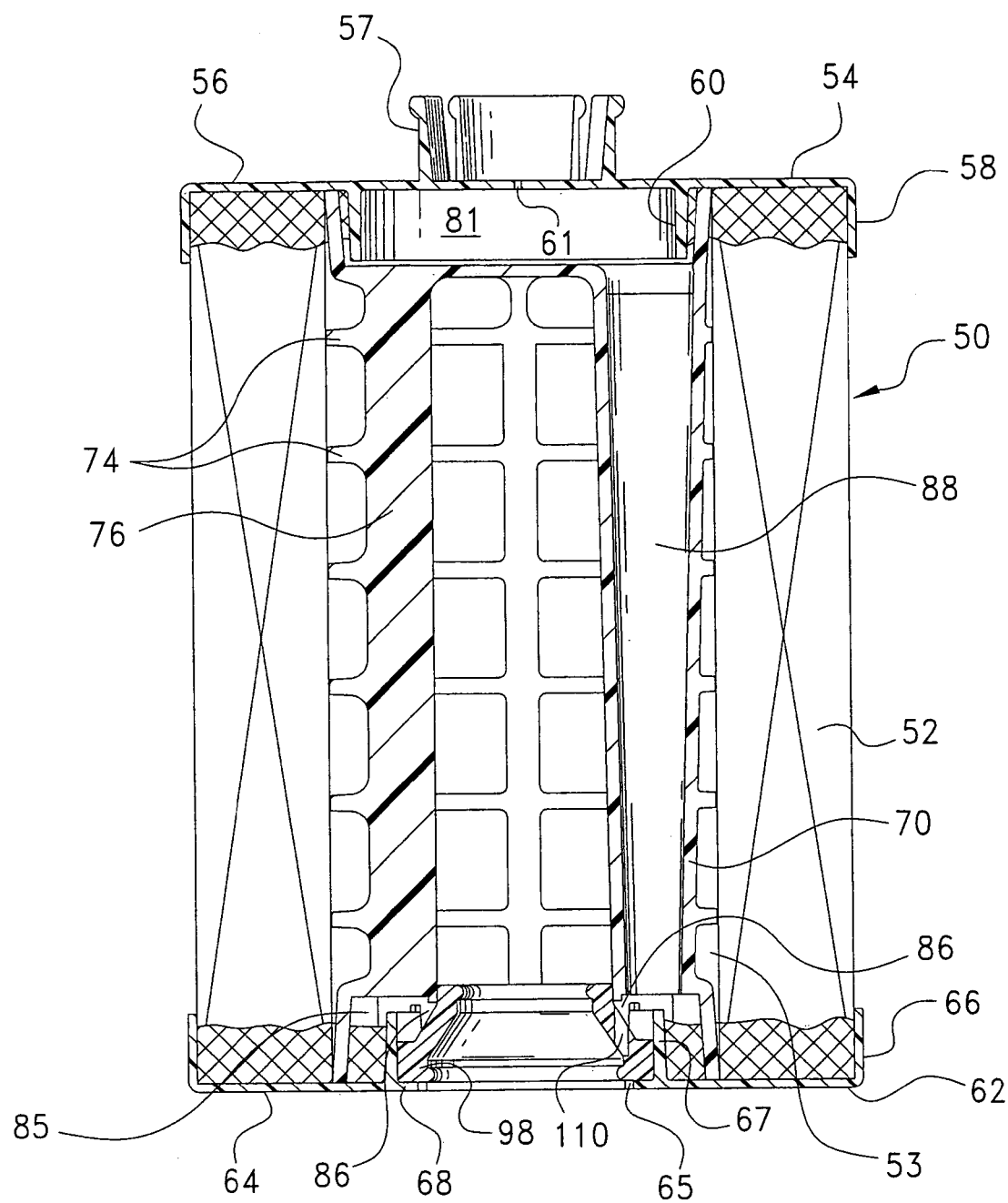
FIG. 3 is a cross-sectional side view of the filter element for the filter assembly of FIG. 1.

In any case, referring now to FIGS. 1–3, the filter assembly further includes a filter element, indicated generally at 50, located internally of the housing. Element 50 includes a ring of filtration media 52 circumscribing a central axis and defining a central cavity 53. The media ring is formed from a material having an efficiency and structure (pleated, blown, etc.) appropriate for the particular application.

A first end cap 54 includes an imperforate circular body portion 56, and is sealingly bonded by appropriate potting compound to a first, upper end of the media ring. A plurality of flexible fingers as at 57 can be provided on the outer surface of the body portion 56 and project axially upward/outwardly therefrom, for temporary locking engagement with appropriate geometry (tabs, grooves, etc.) on the inside surface of the cover 19 (see FIG. 1). A short annular skirt 58 extends around the outer periphery of the first end cap and projects a short distance from the first end cap towards the second end cap, to outwardly bound and support the media 52. A short annular collar 60 extends axially inwardly (downwardly) from the inner surface of the body portion into the central cavity 53 of the media. A small vent orifice 61 is provided in the body portion 56 of the end cap, preferably along the central axis of the element, or at least radially inward from the media ring 52, the function of which will be described below. The size of the vent orifice 61 can vary depending upon the application, however in one application the vent orifice was an opening having a diameter of between 0.018 and 0.020 inches. First end cap 54 is preferably formed in one piece (unitary) from appropriate material, e.g., plastic, using conventional processes.

A second end cap 62 includes an imperforate annular body portion 64 defining a central opening 65, and is sealingly bonded by appropriate potting compound to a second, lower end of the media ring. A short annular skirt 66 extends around the outer periphery of the second end cap and projects a short distance from the second end cap towards the first end cap, to also outwardly bound and support the media 52. A short annular collar 67 extends axially inwardly/upwardly from the inner surface of the second end cap, into the central cavity 53 of the media. The annular body portion 64 and collar 67 define an annular shoulder 68, projecting radially inwardly from the collar and bounding the central opening 65. Second end cap 62 is also preferably formed in one piece (unitary) from appropriate material, e.g., plastic, using conventional processes.

Figure 4:
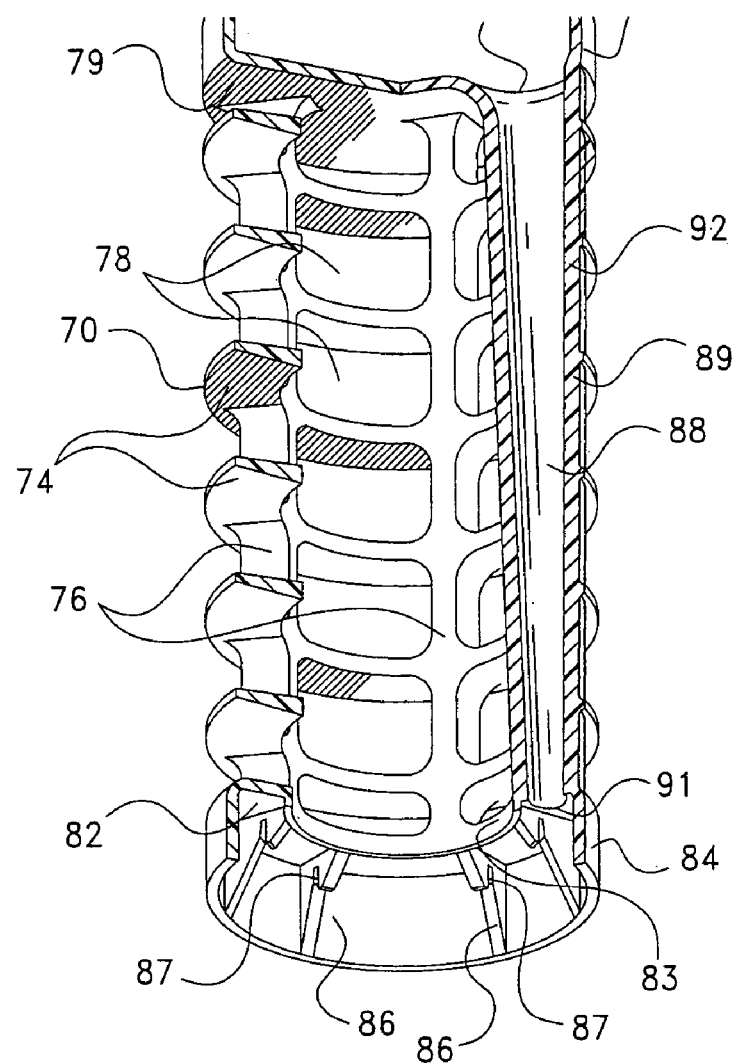
FIG. 4 is an elevated perspective view, in partial cross-section, of the support core for the filter assembly.

A central core 70 is received internally of the media 52 to provide support for the element. Support core 70 extends along the entire length of the media. Referring now to FIG. 4, support core 70 includes a cylindrical frame preferably having a series of annular, lateral support members as at 74; and a series of axial, longitudinal support members as at 76, with support members 74 and 76 defining a series of radial flow openings as at 78. Lateral support members 74 have an outer dimension sufficient to engage and support an inner dimension of media ring 52, and an inner dimension sufficient to receive central standpipe 34.

The uppermost lateral support member 79 has an imperforate, circular configuration, and includes an annular collar 80 bounding the periphery thereof and projecting outwardly (upwardly) therefrom. As can be seen in FIGS. 1 and 3, collar 80 is dimensioned to be received between collar 60 of first end cap 54 and media 52, and is sealingly bonded to the first end cap by the potting compound when the first end cap is fixed to the media ring. When so assembled, a first, upper circular chamber 81 in communication with the vent opening 61 is defined between the uppermost lateral support member 79 and the first end cap 54.

Similarly, referring again to FIG. 4, the lowermost lateral support member 82 has an imperforate, annular configuration defining a central opening 83, and includes an annular collar 84 bounding the periphery thereof and projecting outwardly (downwardly) therefrom. Collar 84 is dimensioned to be received between collar 67 of second end cap 62 and media 52 (as shown in FIGS. 1 and 3), and sealingly bonded to the second end cap by the potting compound when the second end cap is fixed to the media ring. A second, lower annular chamber 85 is defined between the lowermost lateral support member 82 and the second end cap 62.

A series of radial support members 86 are provided in spaced arrangement around the lowermost lateral support member 82, and project inwardly from the collar 84 to the central opening 83. Each radial support member 86 can have an axial slot as at 87, which is dimensioned to receive collar 67 from the lower end cap to facilitate locating, fixing and supporting the lower end cap on the core during the assembly process. The radial support members 86 also facilitate locating and supporting a sealing device, as will be described below.

An axial fluid passage 88 is provided integrally with support core 70. Fluid passage 88 is defined by a tubular or cylindrical body 89 which defines a flow path fluidly separate and independent from the radial flow openings 78. Specifically, fluid passage 88 has an upper end 90 which opens into upper chamber 81 bounded by upper collar 80; a lower end 91 which opens into lower chamber 85 bounded by lower collar 84; and a body portion 92 which passes through each of the lateral support members 74 from the top to the bottom of the curve.

While it is preferred that fluid passage 88 be internal to support core 70, it is possible that the channel could be external to the core, such as extending along the outer surface of the core, or even physically separate (spaced) therefrom, depending on the composition of the filter media 52. For example, if the media were a blown or formed media, the channel could be formed internal to the media, and radial passages at the upper and lower ends could be provided to connect the upper chamber 81 with the lower chamber 85.

In any case, support core 70 with passage 88 is preferably formed in one piece (unitary) from appropriate material, e.g., plastic, using conventional processes; and as described previously, is preferably fixed to first and second end caps 54, 62, by embedding the collars 80, 84 in the potting compound at the ends of the media. The number of lateral support members 74 and longitudinal support members 76 on core 70 can vary depending on the strength requirements and the desired flow through the assembly. The radial dimension of the fluid passage 88 will also depend on the anticipated air to be vented from the housing. The support core 70 could, of course, have other configurations other than the perforate configuration illustrated in the figures (i.e., with lateral and longitudinal support members), e.g., it could be a cylindrical, perforated tube. It is also possible that if the media ring had sufficient internal support, that the core could merely comprise the upper and lower collars 80, 84, supported by the body 89 of the fluid channel, that is, the frame members of the core could be absent in certain applications and the media would still be sufficiently supported, by the collars and fluid channel. Other alternatives should also be apparent.

Figure 5:
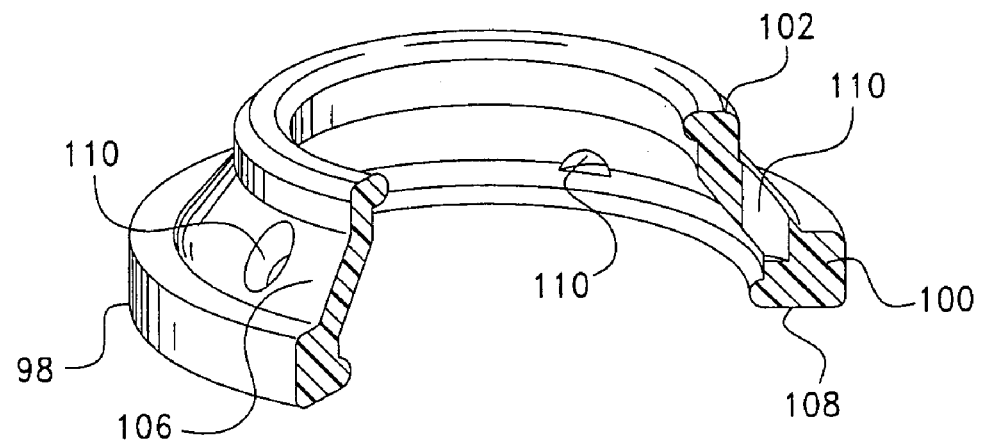
FIG. 5 is an elevated perspective view, in partial cross-section, of the sealing device for the filter assembly.

An annular sealing device, indicated at 98 in FIGS. 2 and 5, is provided toward the lower end of the element. Sealing device 98 has a radially-enlarged base portion 100 at one outer end, a radially-reduced head portion 102 at the other, inner end, and a frusto-conical intermediate portion 106, interconnecting the base and head portions, and having an inner geometry which substantially matches the outer geometry of the frusto-conical portion 39 of the standpipe (as can be seen in FIG. 1). The base portion 100 has a flat lower surface 108, and an outer dimension sufficient to fit closely within collar 67 of the lower end cap 62, and against radial shoulder 68. Base portion 100 projects radially inward slightly into opening 65 and has an inner cylindrical device dimensioned to closely receive and seal against the outer periphery of the enlarged portion 41 of the standpipe 32.

The head portion 102 of the sealing device likewise has an outer dimension such that it can be inserted through opening 83 and received internally of the lowermost lateral support member 82. Head portion 102 likewise projects slightly inwardly and has an inner cylindrical surface dimensioned to closely receive and seal against the narrow portion 40 of the standpipe when the element is received on the standpipe.

When the sealing device is located between the core and the lower end cap as described above, the radial support members 56 on the lower part of the core 70 each have an outer tapered edge dimensioned to support the outer surface of the sealing device, particularly in the area of the intermediate portion 106 (see, e.g., FIG. 3). This facilitates locating the sealing device during assembly, as well as maintain proper fluid seals between the core and the media (through the lower end cap) during use.

The intermediate portion 106 of the annular sealing device has at least one, and preferably has a series of through-passages 110 formed radially and somewhat axially therethrough. As can be seen in FIG. 1, through-passage(s) 110 are aligned with and fluidly interconnect the lower chamber 85 in collar 84 with the openings(s) 38 in the central standpipe, to fluidly-interconnect the fluid passage 88 in the filter element with the drain passage 37 in the standpipe base. The number of through-passages 110 can vary depending on the desired flow through the fluid passage 88.

As can be seen in FIG. 1, a slight radial gap 112 is provided between the intermediate portion 106 of the sealing device and the conical portion 39 of the standpipe. This gap defines a circumferential flow channel such that fluid can enter this area and flow to openings 38 in standpipe 34, regardless of the circumferential orientation of the through-passages 110 and openings 38 when the filter element is installed in the housing.

As should be apparent from the above, when the element is installed in the housing, and fluid to be filtered is introduced through inlet port 23, the fluid flows around the periphery of the filter element, and radially-inward through the media 52, where particulates and other contaminants are separated. The clean fluid then passes through openings 78 in the support core, and up and around the distal end of standpipe 34, where the fluid then passes down through the channel 35 in the standpipe, and through channel 42 in base 32 to outlet port 24. Any air in the incoming fluid has a tendency to rise to the upper portion of the housing, around upper end cap 54, where the air can then pass through vent opening 61 in the upper end cap, and down through fluid passage 88, through through-passages 110 in the sealing device, through drain channel 37 in standpipe 34 to channel 43 in the base 32, and then to drain port 25. The vent opening 61 is sized as appropriate to allow sufficient air to pass to the drain port, and yet is preferably small enough to prevent significant fluid leakage. Again, any fluid leaking through opening 61 is directed through the drain path to tank.

When the element is removed from the housing (by removing cover 19) when the element becomes spent, and replaced with a fresh element, the vent orifice is of course likewise replaced, as it is an integral component with the element. This reduces the chance that the orifice will become clogged over time, thereby preventing air in the housing to vent to the drain port.

Again, the height and dimension of the standpipe 34, the size of the vent orifice 61, the dimensions of the fluid passage 88, and other dimensional characteristics of the filter element and housing, can of course vary depending on the particular application and anticipated fluid and air flows in the system.

Figure 6:
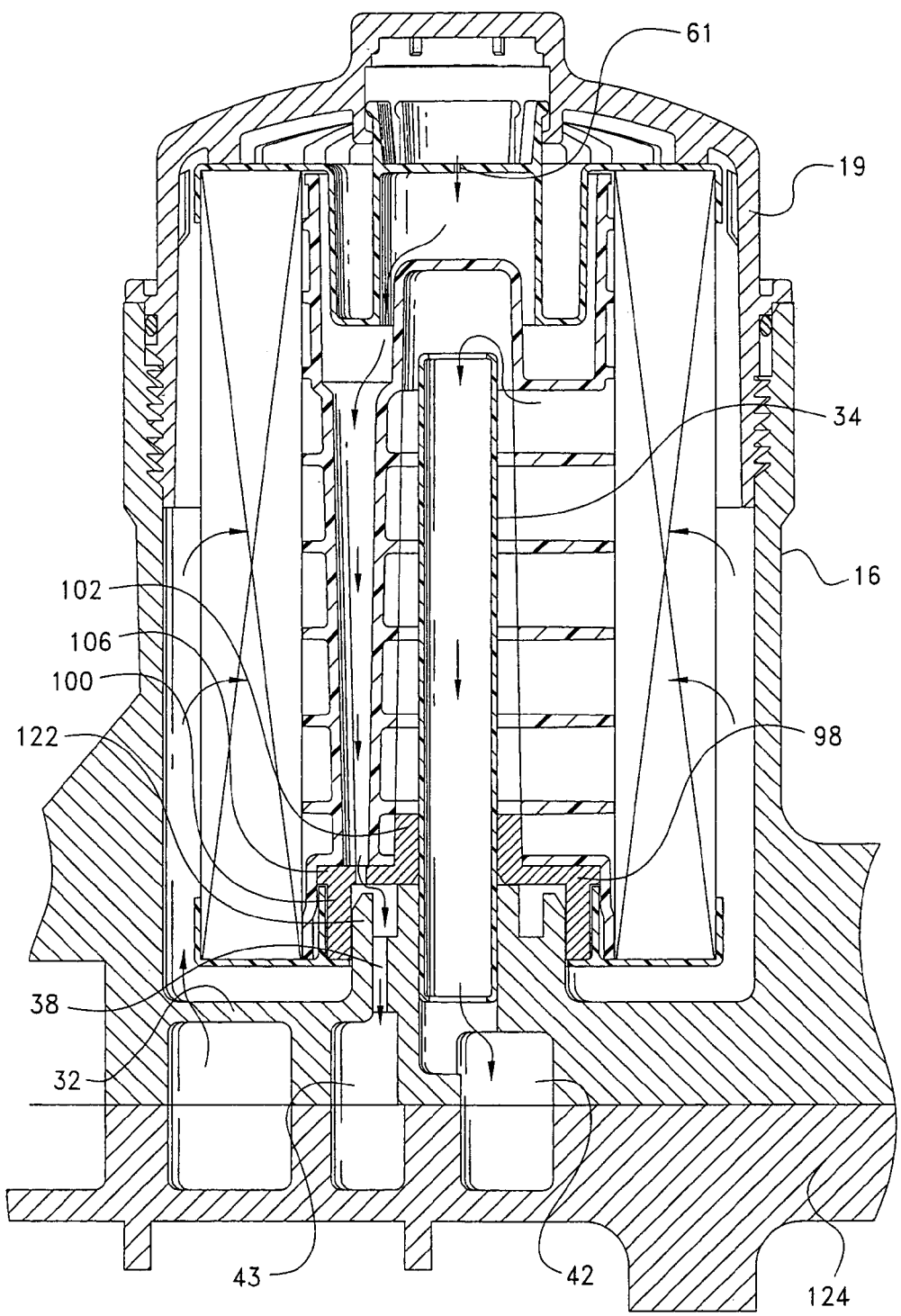
FIG. 6 is a cross-sectional side view of the filter assembly showing a further embodiment of the present invention.

According to a second embodiment of the present invention, as shown in FIG. 6, the base 32 of the standpipe assembly could be formed in one piece with the lower end of the canister 16. In this case, the standpipe member 34 can be formed in one piece (unitary) with the base 32, or alternatively, as illustrated, could be formed separately from the base and then attached such as with adhesive, press-fit or welding. Second openings 38 are in this embodiment formed through an annular projecting portion 122 of base 32, and sealing device 98 has a cup-shaped configuration with annular, enlarged base portion 100; annular, reduced head portion 102; and lateral intermediate portion 106, to receive and seal over the annular projecting portion 122. A slight clearance is again provided between the sealing device and the standpipe assembly to allow flow between the openings 110 in the sealing device and the second openings to the second channel, regardless of the circumferential orientation of the openings 110 in the sealing device and the second openings in the annular projecting portion 122. Channels such as 42 and 43 described previously, are formed in base 32 to direct fluid flow to the outlet and drain ports in plate 124. The remainder of the filter assembly is preferably substantially the same as described above with respect to the first embodiment, and will not be further described for sake of brevity.

In either of the above embodiments, the sealing device 98 thereby fluidly-separates the incoming, dirty fluid from inlet port 23 passing radially-inward through the media 52, from the clean fluid on the downstream side of the media flowing through passages 78 into the central standpipe 34. The sealing device 98 also fluidly-separates the flow through fluid passage 88 from the flow passing through the media into the central standpipe. The sealing device provides for fluidly sealing the device appropriately to the central standpipe and the housing, so that the fluid passages are provided regardless of the rotational orientation of the device on the standpipe. The configuration of the standpipe and the sealing device also facilitates axially locating the filter element along the standpipe—the element fits downward on the standpipe until the sealing device engages the intermediate portion 106—at which point the filter element is properly located. Of course, other locating features, such as ribs or flanges projecting axially upward from the lower end of the housing and engaging the lower end cap, can also be provided to properly axially and radially locate the element in the housing.

Sealing device 98 can be made of any resilient or pliant material appropriate for the particular application, and is preferably a member formed from an elastomeric material. While the sealing device is shown as being formed in one piece (unitary), it is possible the device could be formed of multiple pieces, connected to each other or even slightly separated—with a space or gap between a base and head portion to define the through-passage 110. In these cases, portions of the sealing device could be formed of relatively rigid materials, as long as appropriate portions of the sealing device were resilient to provide a seal with the standpipe.

As described above, the present invention thereby provides a novel and unique filter assembly and element for fluid applications which require a purging of air, and has a simple, low cost design. The drain path for the vented air (and associated fluid leakage) is provided centrally through the element, and more particularly, through a separate and independent fluid channel preferably formed integral with a central support core for the element. The fluid channel directs air from a vent orifice in an upper end cap of the filter element—to a drain path internal to a central standpipe. The vent orifice is integral with the filter element and advantageously replaced when the filter element is replaced, which reduces the risk of the orifice becoming plugged.

What is claimed is:

1. A filter element, comprising:
   a ring of filtration media having a first end and a second end and circumscribing a central cavity;
   a first imperforate end cap sealingly bonded to the first end of the media ring, the first end cap including a vent orifice into the central cavity of the media ring;
   a second imperforate end cap sealingly bonded to the second end of the media ring, the second end cap having an annular body portion defining a central opening;
   a support core disposed in the central cavity of the media ring between the first and second end caps and supporting an inner dimension of the media ring, the support core having a perforate frame allowing fluid flow passing radially through the media ring to pass radially through the core into the central cavity;
   a fluid passage in the support core from a first end in fluid communication with the vent orifice, to a second end, the fluid passage being separate and independent of the flow through the media and the frame of the core; and
   an annular resilient sealing device carried by the second end cap and bounding the central opening therein, the sealing device fluidly separating the fluid passage from the flow through the media ring and frame, and including at least one through-passage fluidly interconnecting the second end of the fluid passage with the central opening in the second end cap, and an intermediate portion of the sealing device between first and second circumferential portions, the at least one through-passage located in the intermediate portion of the sealing device.

2. The filter element as in claim 1, wherein the support core has a cylindrical configuration.

3. The filter clement as in claim 1, wherein the support core extends between and interconnects the first and second end caps.

4. The filter element as in claim 3, wherein the support core is sealingly bonded at both ends to the first and second end caps, respectively.

5. The filter element as in claim 1, wherein the support core comprises a frame of interconnected longitudinal and lateral support members defining a plurality of radial flow openings.

6. The filter element as in claim 1, wherein the support core comprises a frame, and the tubular fluid passage is integral with the frame.

7. The filter element as in claim 1, wherein the support core includes locating and support means at one end for i) locating and supporting the sealing device; and ii) receiving a corresponding locating feature of the second end cap to locate and support the second end cap with respect to the support core.

8. The filter element as in claim 7, wherein the locating feature of the second end cap includes an annular collar, and the locating and support means of the support core comprises a plurality of radial flanges with a groove for receiving the collar of the second end cap.

9. The filter element as in claim 1 wherein the first end cap and core define a first chamber in communication with the vent orifice and with a first end of the tubular fluid passage; and the second end cap and core define a second chamber in fluid communication with a second end of the fluid passage, and the sealing device is located such that the at least one through passage is fluidly connected with the second chamber.

10. The filter element as in claim 1, wherein the second end cap includes an annular shoulder that supports a base portion of the sealing device, and the sealing device has a dimension such that an inner end of the sealing device fits closely within the second end of the support core.

11. The filter element as in claim 1, wherein the sealing device has a radially-enlarged first circumferential portion at a first, outer end, and a radially-reduced second circumferential portion at a second, inner end.

12. The filter element as in claim 11, wherein the first circumferential portion has an exposed inner cylindrical surface capable of sealing against a first cylindrical housing portion received internally of the first circumferential portion; and the second circumferential portion has an exposed inner cylindrical surface capable of sealing against a second cylindrical housing portion received internally of the second circumferential portion.

13. The filter element as in claim 1, wherein the scaling device has a frustoconical configuration.

14. The filter element as in claim 1, wherein the sealing device has a cup-shaped configuration.

15. A filter element, comprising:
a ring of filtration media having a first end and a second end and circumscribing a central cavity;
a first imperforate end cap sealingly bonded to the first end of the media ring, the first end cap including a vent orifice into the central cavity of the media ring;
a second imperforate end cap sealingly bonded to the second end of the media ring, the second end cap having an annular body portion defining a central opening;
a cylindrical support core disposed in the central cavity of the media ring and supporting an inner dimension of the media ring, the support core interconnecting the first and second end caps, and having a perforate frame allowing fluid flow passing radially through die media ring to pass radially through the core into the central cavity;
a tubular fluid passage integral with the support core and extending from the first end of the support core in fluid communication with die vent orifice, to the second end of the support core, the fluid passage being separate and independent of the flow through die media and the frame of die core; and
an annular resilient sealing device carried by the second end cap and hounding die central opening therein, the sealing device fluidly separating the fluid passage of die core from die flow through the media ring and frame, and including at least one through-passage fluidly interconnecting the tubular fluid passage with the central opening in the second end cap, the sealing device having i) a radially-enlarged first circumferential portion at a first, outer end supported by the second end cap; ii), a radially-reduced second circumferential portion at a second, inner end, received within the core; and iii) an intermediate portion between the first and second circumferential portions, the at least one through-passage located in die intermediate portion of the sealing device, the first circumferential portion having an exposed inner cylindrical surface capable of sealing against a first cylindrical housing portion received internally of the first circumferential portion; and the second circumferential portion having an exposed inner cylindrical surface capable of sealing against a second cylindrical housing portion received internally of die second circumferential portion.

16. The filter element as in claim 15, wherein the support core includes locating and support means at one end for i) locating and supporting the sealing device; and ii) receiving a corresponding locating feature of the second end cap to locate and support the second end cap with respect to the support core.

17. The filter element as in claim 16, wherein the locating feature of the second end cap includes an annular collar, and the locating and support means of the support core comprises a plurality of radial flanges with a groove for receiving the collar of the second end cap.

18. The filter element as in claim 15, wherein the first end cap and core define a first chamber in communication with the vent orifice and with a first end of the fluid channel; and the second end cap and core define a second chamber in fluid communication with a second end of the fluid channel, the sealing device located such that the at least one flow passage is fluidly connected with the second chamber.

19. A filter assembly comprising:
a housing including a canister with a closed end and an open end and an inlet port to direct fluid to be filtered into the housing;
a cover for the open end of the canister and together therewith defining an internal chamber; and
a filter element disposed within the internal chamber of the housing;
a standpipe assembly including a standpipe member projecting away from the closed end of the canister toward the open end, and a pair of fluidly-separate flow channels defined through the standpipe assembly, a first of the flow channels opening to a distal end of the standpipe member and extending through the standpipe member to an outlet port in the housing for directing filtered fluid from the housing; and the second of the flow channels opening along the standpipe assembly and extending to a drain port in the housing;
the filter element including a ring of filtration media having an upper end and a lower end and circumscribing a central cavity; a first imperforate end cap sealingly bonded to the upper end of the media ring, the first end cap including a vent orifice; a second imperforate end cap sealingly bonded to the lower end of the media ring, the second end cap having an annular body portion defining a central opening; a central core disposed in the central cavity of the media ring allowing flow through the media ring into the central cavity of the element and into and through the first channel of the standpipe member to the outlet port, means defining a separate and independent fluid passage from the upper end cap in fluid communication with the vent orifice, to the second end cap; and a resilient annular sealing member carried by the second end cap and bounding the central opening therein, the sealing device receiving and sealing to the standpipe member in the housing, and fluidly separating the second flow channel from the flow of fluid through the media ring and core to the first flow channel by the outlet port, the sealing member including at least one through-passage fluidly interconnecting the second flow channel with the drain port in the housing to allow air in the housing to pass through the vent orifice in the first end cap, through the second flow channel, and through the at least one through-passage to the drain port, and an intermediate portion of the sealing member between first and second circumferential portions, the at least one through-passage located in the intermediate portion of the sealing member.

20. The filter assembly as in claim 19, wherein the standpipe member includes a radially-enlarged portion towards the closed end of the canister and a radially narrower portion away from the closed end of the canister, and the opening into the second flow channel opens into a frusto-conical tapered portion of the standpipe member interconnecting the radially-enlarged portion and the radially-narrower portion; and the sealing device includes a frusto-conical tapered portion corresponding to the frusto-conical tapered portion of the standpipe member.

21. The filter assembly as in claim 19, wherein the standpipe assembly includes a radially-enlarged portion towards the closed end of the canister and a radially reduced portion away from the closed end of the canister, and the opening into the second flow channel is located in an annular projecting portion intermediate the radially-enlarged portion and the radially-reduced portion; and the sealing member includes a lateral portion sealing to the projecting portion of the standpipe.

22. A filter assembly comprising;
a housing including a canister with a closed end and an open end and an inlet port to direct fluid to be filtered into the housing;
a cover for the open end of the canister and together therewith defining an internal chamber; and
a filter element disposed within the internal chamber of the housing;
a standpipe assembly means projecting away from the closed end of the canister toward the open end, and a pair of fluidly-separate flow channels defined through the standpipe assembly means, a first of the flow channels opening to a distal end of the stand pipe assembly means and extending through the standpipe assembly means to an outlet port in the housing for directing filtered fluid from the housing; and a second of the flow channels extending from a second opening in the standpipe assembly means to a drain port in the housing;
the filter element including a ring of filtration media having an upper end and a lower end and circumscribing a central cavity; a first imperforate end cap sealingly bonded to the upper end of the media ring, the first end cap including an opening into the central cavity; a second imperforate end cap sealingly bonded to the lower end of the media ring, the second end cap having an annular body portion defining a central opening; a central core disposed in the central cavity of the media ring allowing flow through the media ring into the central cavity of the element and into and through the first channel of the standpipe assembly means to the outlet port, means defining a separate and independent fluid passage from the upper end cap in fluid communication with the opening therein, to the second end cap; and a resilient annular sealing means carried by the second end cap and bounding the central opening therein, the sealing means receiving and sealing to the standpipe assembly means in the housing, and fluidly separating the fluid passage means from the flow of fluid through the media ring, the sealing means including at least one through-passage fluidly interconnecting the fluid passage means with the second opening in the standpipe assembly means into the second flow channel to allow air in the housing to pass through the opening in the upper end cap, through the fluid passage means, through the at least one through-passage in the sealing means, and through the second flow channel to the drain port and an intermediate portion of the sealing means between first and second circumferential portions, the at least one through-passage located in the intermediate portion of the sealing means.

23. The filter assembly as in claim 22, wherein the standpipe assembly means includes a radially-enlarged portion towards the closed end of the canister and a radially reduced portion away from the closed end of the canister, and the second opening into the second flow channel is located in a frusto-conical tapered portion of the standpipe assembly means interconnecting the radially-enlarged portion and the radially-reduced portion; and the sealing means includes a frusto-conical tapered portion corresponding to the frusto-conical tapered portion of the standpipe assembly means.

24. The filter assembly as in claim 22, wherein the standpipe assembly means includes a radially-enlarged portion towards the closed end of the canister and a radially reduced portion away from the closed end of the canister, and the second opening into the second flow channel is located in an annular projecting portion intermediate the radially-enlarged portion and the radially-reduced portion; and the sealing means includes a lateral portion corresponding to the projecting portion of the standpipe assembly means.

* * * * *

UNITED STATES PATENT AND TRADEMARK OFFICE
CERTIFICATE OF CORRECTION

PATENT NO.        : 7,147,110 B2
APPLICATION NO.   : 10/902620
DATED             : December 12, 2006
INVENTOR(S)       : Michael D. Clausen and Russell D. Jensen It is certified that error appears in the above-identified patent and that said Letters Patent is hereby corrected as shown below:

Column 10, Line 3, delete the word "die", and insert therefore --the--.

Column 10, Line 8, delete the word "hounding", and insert therefore --bounding--.

Column 10, Lines 8-9, delete the word "die", and insert therefore --the--.

Column 10, Line 10, delete the word "die", and insert therefore --the--.

Column 10, Line 20, delete the word "die", and insert therefore --the--.

Signed and Sealed this
First Day of May, 2012

David J. Kappos
*Director of the United States Patent and Trademark Office*

UNITED STATES PATENT AND TRADEMARK OFFICE
CERTIFICATE OF CORRECTION

PATENT NO. : 7,147,110 B2  
APPLICATION NO. : 10/902620  
DATED : December 12, 2006  
INVENTOR(S) : Michael D. Clausen and Russell D. Jensen Page 1 of 1

It is certified that error appears in the above-identified patent and that said Letters Patent is hereby corrected as shown below:

In the Claims

Column 10, Line 3, delete the word "die", and insert therefore --"the"--.

Column 10, Line 8, delete the word "hounding", and insert therefore --"bounding"--.

Column 10, Line 9, delete the word "die", and insert therefore --"the"--.

Column 10, Line 10, delete the word "die", and insert therefore --"the"--.

Column 10, Line 20, delete the word "die", and insert therefore --"the"--.

Signed and Sealed this  
Ninth Day of February, 2016

Michelle K. Lee  
*Director of the United States Patent and Trademark Office*